US012680577B2

(12) United States Patent
Han et al.

(10) Patent No.: US 12,680,577 B2
(45) Date of Patent: Jul. 14, 2026

(54) MOUNTING AND DISASSEMBLING ASSEMBLY, SHAFT AND BEARING ASSEMBLY, MOUNTING METHOD, AND DISASSEMBLING METHOD

(71) Applicant: Schaeffler Technologies AG & Co. KG, Herzogenaurach (DE)

(72) Inventors: Huimin Han, Taicang Jiangsu (CN); Klaus Zimmermann, Oberthulba (DE); Thomas Dittrich, Hammelburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 238 days.

(21) Appl. No.: 18/709,283

(22) PCT Filed: Nov. 26, 2021

(86) PCT No.: PCT/CN2021/133655
§ 371 (c)(1),
(2) Date: Dec. 17, 2024

(87) PCT Pub. No.: WO2023/092486
PCT Pub. Date: Jun. 1, 2023

(65) Prior Publication Data
US 2025/0122908 A1    Apr. 17, 2025

(51) Int. Cl.
*F16C 35/073* (2006.01)
*F16C 35/06* (2006.01)
*F16C 35/078* (2006.01)

(52) U.S. Cl.
CPC .......... *F16C 35/073* (2013.01); *F16C 35/062* (2013.01); *F16C 35/078* (2013.01)

(58) Field of Classification Search
CPC ........ F16C 19/385; F16C 25/06; F16C 35/06; F16C 35/061; F16C 35/062; F16C 35/07;
(Continued)

(56) References Cited

U.S. PATENT DOCUMENTS 4,343,565 A * 8/1982 Hallerback ............. F16D 1/096
384/538
4,626,114 A * 12/1986 Phillips ................... F16D 1/094
384/538
(Continued)

FOREIGN PATENT DOCUMENTS

CN 201129366 Y 10/2008
CN 109590713 A 4/2019
(Continued)

*Primary Examiner* — Alan B Waits
(74) *Attorney, Agent, or Firm* — Volpe Koenig

(57) ABSTRACT

A mounting and disassembling assembly having an outer sleeve, an inner sleeve and a supporting ring. The outer circumferential surface of the outer sleeve has a first mounting surface for mounting a bearing; and the inner circumferential surface has a first conical surface. The inner circumferential surface of the inner sleeve has a second mounting surface for mounting on a shaft; and the outer circumferential surface is formed with a threaded portion and a second conical surface. The supporting ring is threadedly connected to the threaded portion. Mounting is enabled by pre-mounting the bearing on the outer sleeve and sliding the first conical surface on the second conical surface. This prevents damage during mounting and makes disassembling easier. Also provided are a shaft and bearing assembly having the mounting and disassembling assembly, and a mounting method and a disassembling method using this assembly.

20 Claims, 15 Drawing Sheets

(58) Field of Classification Search
CPC .. F16C 35/073; F16C 35/078; F16C 2226/60;
F16C 2226/62; F16C 2229/00; F16C
2237/00
See application file for complete search history.

(56) References Cited

U.S. PATENT DOCUMENTS

| | | | | |
|---|---|---|---|---|
| 4,916,750 | A | * | 4/1990 | Scott .................... F16C 23/086 |
| | | | | 384/558 |
| 2003/0037438 | A1 | * | 2/2003 | Nisley ................... F16D 1/096 |
| | | | | 29/898.07 |
| 2004/0211065 | A1 | * | 10/2004 | Nisley ................... F16D 1/096 |
| | | | | 29/898.07 |
| 2006/0093251 | A1 | | 5/2006 | Casey et al. |
| 2021/0372468 | A1 | * | 12/2021 | Han ................... F28D 21/0014 |

FOREIGN PATENT DOCUMENTS

| | | | | |
|---|---|---|---|---|
| CN | 209621853 | U | 11/2019 | |
| CN | 112805481 | A | 5/2021 | |
| CN | 111633606 | B | 3/2022 | |
| DE | 4211365 | C1 | 5/1993 | |
| DE | 10161066 | A1 | 8/2002 | |
| EP | 0156104 | B1 | 10/1989 | |
| GB | 190215132 | A * | 5/1903 | ............. F16D 1/096 |
| JP | 6650155 | B1 | 2/2020 | |
| WO | 2018017030 | A1 | 1/2018 | |

* cited by examiner

MOUNTING AND DISASSEMBLING ASSEMBLY, SHAFT AND BEARING ASSEMBLY, MOUNTING METHOD, AND DISASSEMBLING METHOD

CROSS-REFERENCE TO RELATED APPLICATIONS

This application is the U.S. National Phase of PCT Appln. No. PCT/CN2021/133655, filed Nov. 26, 2021, the entire disclosure of which is incorporated by reference herein.

TECHNICAL FIELD

The present application relates to the field of mounting and disassembling of shafts and bearings, in particular to a mounting and disassembling assembly and a shaft and bearing assembly including the mounting and disassembling assembly. Also provided are a mounting method for mounting a bearing on a shaft using the mounting and disassembling assembly and a disassembling method for disassembling the bearing from the shaft using the same.

BACKGROUND

In the prior art, for bearings such as thrust bearings, they are usually mounted directly on a shaft during use. However, the method for directly mounting the bearings on the shaft comes with the following problems.

On the one hand, the mechanical force may be transmitted through a rolling element of the bearing in mounting the bearing with the above method. This may damage the tracks of the inner and outer rings, resulting in the shorter life of the bearing. On the other hand, disassembling will be quite difficult when it comes to disassembling the bearing from the shaft. Therefore, there is an urgent need for a means to prevent bearing from being damaged during mounting and make disassembling easier.

SUMMARY

The present application aims to address the defects of the prior art as described above. An objective of the present application is to provide a novel mounting and disassembling assembly, which can not only prevent the bearing from being damaged during mounting, but make disassembling of the bearing easier. Another objective of the present disclosure is to provide a shaft and bearing assembly including the mounting and disassembling assembly described above. Still another objective of the present application is to provide a mounting method for mounting a bearing using the mounting and disassembling assembly described above and a disassembling method for disassembling the bearing using the same.

To achieve the above objectives, the present application adopts the following technical solutions.

The present application provides a mounting and disassembling assembly for mounting a bearing on and disassembling it from a shaft, the assembly comprising:

an outer sleeve, wherein an outer circumferential surface of the outer sleeve is formed with a first mounting surface for mounting the bearing; and an inner circumferential surface thereof with a first conical surface that extends to one axial end of the outer sleeve in the axial direction of the mounting and disassembling assembly while extending radially outside;

an inner sleeve, wherein an inner circumferential surface of the inner sleeve is formed with a second mounting surface for mounting on the shaft; and an outer circumferential surface thereof with a second conical surface and a threaded portion located on one axial end side of the second conical surface; the second conical surface extends to the other axial end of the inner sleeve in the axial direction while extending radially inside from the threaded portion; and with the second conical surface located radially inside and in contact with the first conical surface, the inner sleeve and the outer sleeve can move relatively in the axial direction; and a support ring threadedly connected to the threaded portion, wherein the support ring and the inner sleeve can move relatively in the axial direction while maintaining threaded connection.

In an alternative solution, the mounting and disassembling assembly further includes a locking nut that is threadedly connected to the shaft to define the axial position of the outer sleeve relative to the shaft at the other axial end of the outer sleeve.

In another alternative solution, the mounting and disassembling assembly further includes locking bolts.

The inner circumferential surface of the locking nut is formed with an annular groove extending along the circumference of the mounting and disassembling assembly. With the mounting and disassembling assembly mounted on the shaft, the locking nut abuts against the outer sleeve.

The locking nut is formed with mounting holes extending through the annular groove in the axial direction. The locking bolts are mounted into the mounting holes for locking the axial position of the locking nut relative to the shaft.

In another alternative solution, the outer sleeve is formed with a first step structure, the bottom surface of which is the first mounting surface. The first step structure and the supporting ring define the axial position of the bearing.

In another alternative solution, the supporting ring is formed with a second step structure, the bottom surface of which is a third mounting surface for supporting the bearing.

In another alternative solution, an inner oil groove that opens radially inside is formed on the first conical surface of the outer sleeve and an oil supply passage in communication with the inner oil groove is also formed inside the outer sleeve.

In another alternative solution, the inner oil groove includes a circumferential oil groove and a plurality of axial oil grooves spaced apart along the circumference of the mounting and disassembling assembly, each extending in the axial direction. The circumferential oil groove continuously extends along the circumference and is in communication with each of the axial oil grooves.

In another alternative solution, the inner sleeve is formed with a plurality of grooves on the second mounting surface spaced apart along the circumference of the mounting and disassembling assembly, each opening radially inside and extending in the axial direction.

In another alternative solution, the supporting ring is formed with fixing holes that extend through in the axial direction and face an axial end surface of the inner sleeve.

The mounting and disassembling assembly further includes fixing members that pass through the fixing holes and abut against the axial end surface of the inner sleeve, so that the inner sleeve and the supporting ring are relatively fixed.

In another alternative solution, the outer sleeve is formed with first disassembling holes extending in the axial direction; and the locking nut with second disassembling holes extending through it in the axial direction and mated with the first disassembling holes. The second disassembling holes can be aligned with the first disassembling holes by rotating the locking nut relative to the shaft.

In another alternative solution, the supporting ring is formed with third disassembling holes extending in the axial direction, and the second disassembling holes can be aligned with the third disassembling holes by rotating the locking nut relative to the shaft.

The present application further provides a shaft and bearing assembly, comprising: a shaft, a bearing and the mounting and disassembling assembly described in any one of the above technical solutions. The outer sleeve, the inner sleeve and the support ring of the mounting and disassembling assembly are located at least partially between the shaft and the bearing, and the bearing is mounted on and disassembled from the shaft via the mounting and disassembly assembly.

In an alternative solution, a shaft oil supply passage is formed inside the shaft, with an oil outlet disposed in the outer circumferential surface of the shaft and facing the second mounting surface of the inner sleeve.

In another alternative solution, the shaft is formed with a shoulder that abuts against the support ring to axially limit the mounting and disassembling assembly.

The present application further provides a mounting method for mounting a driven bearing on a shaft using the mounting and disassembling assembly described in any one of the above technical solutions, the method comprising the following steps:

fixing the bearing on a first mounting surface of the outer sleeve in a nested manner to abut against a first step structure of the outer sleeve;

inserting the inner sleeve into the outer sleeve to have the second conical surface in contact with the first conical surface;

threadedly connecting the support ring to the inner sleeve, adjusting the threaded connection length of the support ring and the inner sleeve to have a predetermined axial gap between the bearing and the support ring axial limit surface of the supporting ring, and then fixing the support ring and the inner sleeve;

fixing the assembly composed of the outer sleeve, the inner sleeve, the support ring and the bearing on the shaft in a nested manner so that the support ring abuts against the shoulder of the shaft; and pushing the outer sleeve so that the outer sleeve and the bearing move relative to the inner sleeve in the axial direction, and finally the bearing abuts against the support ring axial limit surface of the support ring in the axial direction.

In an alternative solution, during pushing the outer sleeve, hydraulic oil is supplied between the first conical surface and the second conical surface through the oil supply passage of the outer sleeve.

In another alternative solution, after the bearing finally abuts against the support ring axial limit surface of the support ring in the axial direction, the locking nut of the mounting and disassembling assembly is mounted on the shaft against the outer sleeve.

The present application further provides a disassembling method for disassembling a bearing from a shaft using the mounting and disassembling assembly described in some of the above solutions, the method comprising the following steps:

With hydraulic oil supplied to its oil supply passage, the outer sleeve is separated from the inner sleeve, and disassembled from the shaft.

The present application further provides a disassembling method for disassembling a bearing from a shaft using the mounting and disassembling assembly described in any one of the above technical solutions, the method comprising the following steps:

disassembling the outer sleeve and the bearing from the shaft using a screw that passes through a locking nut fixed to the shaft or a disassembling plate abutting against the shaft and is screwed into the first disassembling holes of the outer sleeve; and then, disassembling the inner sleeve from the shaft using a screw that passes through the locking nut or the disassembling plate and is screwed into the third disassembling holes of the support ring.

In an alternative solution, during disassembling the inner sleeve from the shaft, hydraulic oil is supplied between the shaft and the inner sleeve through the shaft oil supply passage of the shaft.

With the above technical solution, the present application provides a novel mounting and disassembling assembly for mounting the bearing on and disassembling it from the shaft. The mounting and disassembling assembly includes an outer sleeve, an inner sleeve and a support ring. The outer circumferential surface of the outer sleeve is formed with a first mounting surface for mounting the bearing; and an inner circumferential surface thereof with a first conical surface that extends to one axial end of the outer sleeve in the axial direction of the mounting and disassembling assembly while extending radially outside. The inner circumferential surface of the inner sleeve is formed with a second mounting surface for mounting on the shaft; and an outer circumferential surface thereof with a second conical surface and a threaded portion located on one axial end side of the second conical surface. The second conical surface extends to the other axial end of the inner sleeve in the axial direction while extending radially inside from the threaded portion. With the second conical surface located radially inside and in contact with the first conical surface, the inner sleeve and the outer sleeve can move relatively in the axial direction. The support ring is threadedly connected to the threaded portion, and the support ring and the inner sleeve can move relatively in the axial direction while maintaining threaded connection.

So the bearing is mounted on the shaft by pre-mounting the bearing on the outer sleeve and sliding the first conical surface of the outer sleeve on the second conical surface of the inner sleeve. Therefore, it is circumvented during mounting that the tracks of the inner and outer rings of the bearing are damaged due to the mechanical force transmitted by the rolling element as described in the background. Moreover, disassembling is easy if needed by the first conical surface of the outer sleeve sliding on the second conical surface of the inner sleeve.

DETAILED DESCRIPTION

Exemplary embodiments of the present application are described below with reference to the accompanying drawings. It is to be understood that these specific descriptions are only used to teach those skilled in the art how to implement the present application, but not to be exhaustive of all possible ways of and limit the scope of the present application.

The outer sleeve, the inner sleeve, the support ring and the locking nut of the mounting and disassembling assembly according to the present application are all rotating parts with a central axis that are assembled coaxially. In the present application, unless otherwise specified, "axial," "radial" and "circumferential" respectively refer to being in the axial and radial directions and along the circumference of the mounting and disassembling assembly when assembled. In addition, "radially inside" refers to the side that is close to the central axis of the mounting and disassembling assembly in the radial direction, and "radially outside" refers to the side that is away from the central axis of the mounting and disassembling assembly in the radial direction.

The structure of the mounting and disassembling assembly according to an embodiment will be described below with reference to the accompanying drawings of the specification.

The Structure of the Mounting and Disassembling Assembly According to an Embodiment of the Present Application The mounting and disassembling assembly according to an embodiment of the present application is for mounting a bearing BE on and disassembling it from a shaft SH, which prevents the bearing BE from being damaged while making mounting and disassembling easier. As shown in FIGS. 1A to 1E, the mounting and disassembling assembly according to an embodiment of the present application includes an outer sleeve 1, an inner sleeve 2, a support ring 3, a locking nut 4, and locking bolt(s) 5 (for example, see FIG. 2E).

Figure 1A:
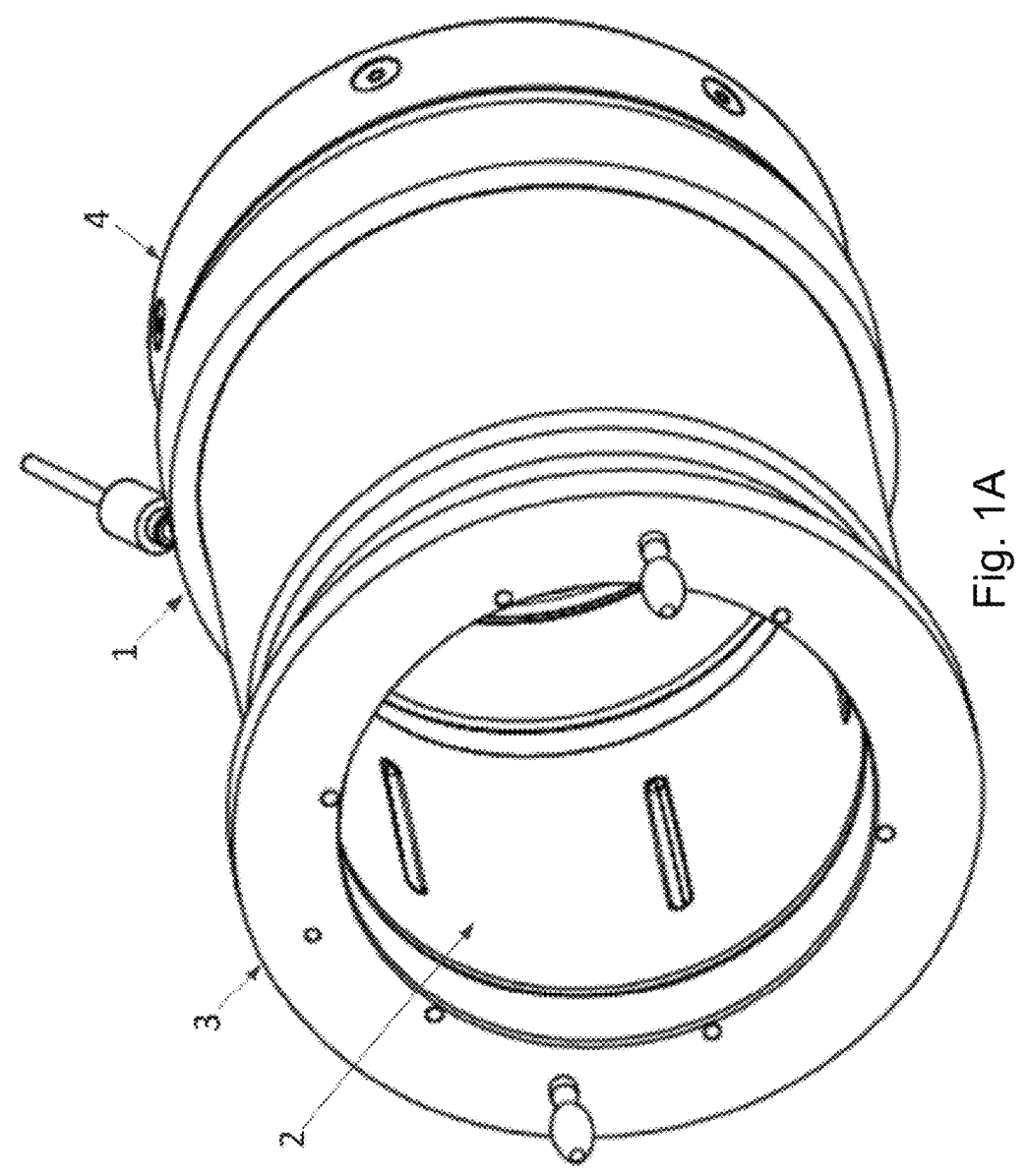
FIG. 1A is a perspective view showing the structure of a mounting and disassembling assembly according to an embodiment of the present application.
Figure 1B:
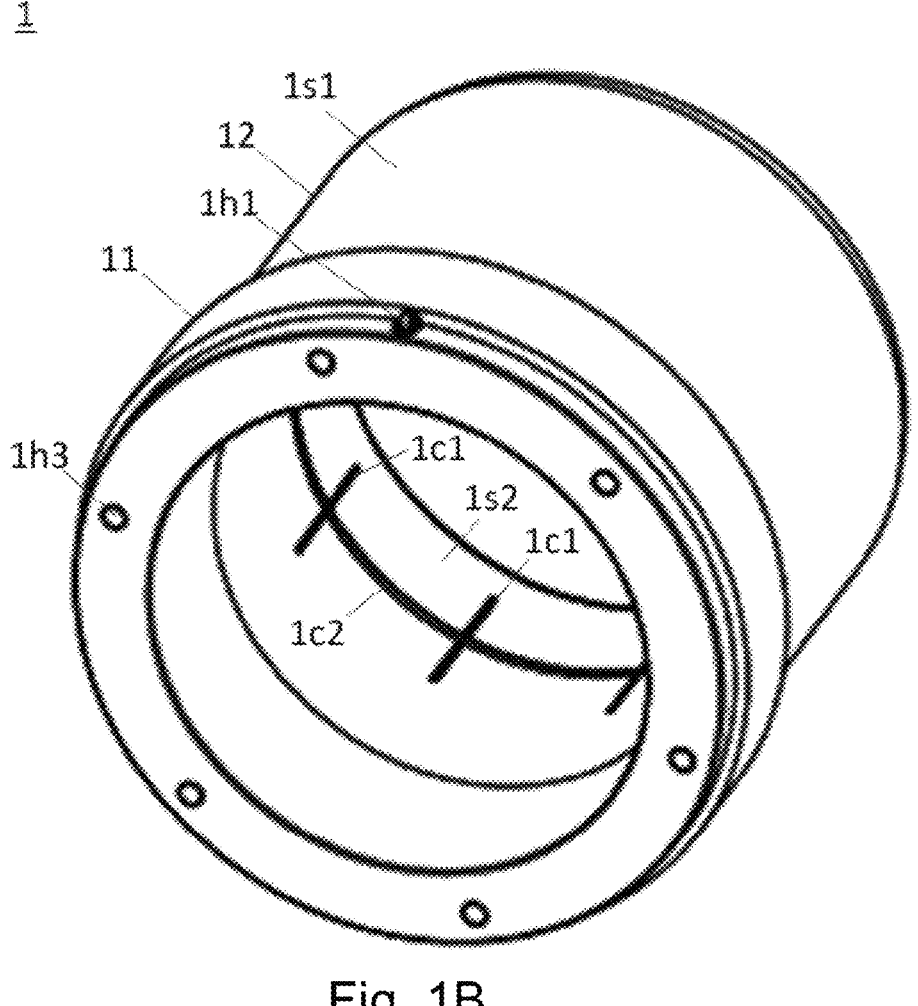
FIG. 1B is a perspective view showing the structure of an outer sleeve of the mounting and disassembling assembly in FIG. 1A.

In the present embodiment, as shown in FIGS. 1A and 1B, the outer sleeve 1 is cylinder-shaped. The outer sleeve 1 includes a first large-diameter portion 11 and a first small-diameter portion 12 interconnected with each other. The outer diameter of the first large-diameter portion 11 is greater than that of the first small-diameter portion 12. Thereby, the outer circumference of the outer sleeve 1 is formed with a first step structure through the first large-diameter portion 11 and the first small-diameter portion 12. At the first small-diameter portion 12, the outer circumferential surface of the outer sleeve 1 is formed with a first cylindrical surface $1s1$ (an example of a first mounting surface) for mounting the bearing BE which is the bottom surface of the first step structure. Furthermore, at the first small-diameter portion 12, a first conical surface $1s2$ is formed on the inner circumferential surface of the outer sleeve 1, extending to one axial end of the outer sleeve 1 in the axial direction A (the first small-diameter portion 12 or the end of the outer sleeve 1 away from the first large-diameter portion 11) while extending radially outside. That is, the inner diameter of the portion of the outer sleeve 1 corresponding to the first conical surface $1s2$ gradually increases toward the axial end.

Furthermore, the outer sleeve 1 and the inner sleeve 2 will move (slide) relatively with the first conical surface $1s2$ of the outer sleeve 1 mated with the below second conical surface $2s2$ of the inner sleeve 2. Thus, the first conical surface $1s2$ of the outer sleeve 1 is formed with an inner oil groove to facilitate their relative movement, as shown in FIG. 1B. The inner oil groove opens radially inside but closes in other directions. The inner oil groove includes a plurality of axial oil grooves $1c1$ and a circumferential oil groove $1c2$. The plurality of axial oil grooves $1c1$ spaced apart along the circumference of the outer sleeve 1 each extends (substantially) along the axial direction A. The circumferential oil groove $1c2$ extends continuously along the full circumference to enable communication between the plurality of axial oil grooves $1c1$. As shown in FIGS. 1B, 2B, 2C and 2E, an oil supply passage $1p$ in communication with the inner oil groove is also formed inside the outer sleeve 1. The oil supply passage $1p$ has an oil inlet $1h1$ at the first large-diameter portion 11 and an oil outlet $1h2$ in the inner oil groove. The oil outlet $1h2$ may be disposed in the axial oil groove $1c1$ or the circumferential oil groove $1c2$, preferably near the area where they intersect. The oil supply passage $1p$ may include an axial passage and a radial passage that communicate with each other. It is to be understood that threads connected to an oil supply pipeline of an oil supply device may be formed at a portion of the oil supply passage $1p$ adjacent to the oil inlet $1h1$. Then, the supply of hydraulic oil through the oil supply passage $1p$ can provide oil pressure and form an oil film between the first conical surface $1s2$ and the second conical surface $2s2$. This facilitates the relative movement between the outer sleeve 1 and the inner sleeve 2 during mounting and disassembling.

Figure 3A:
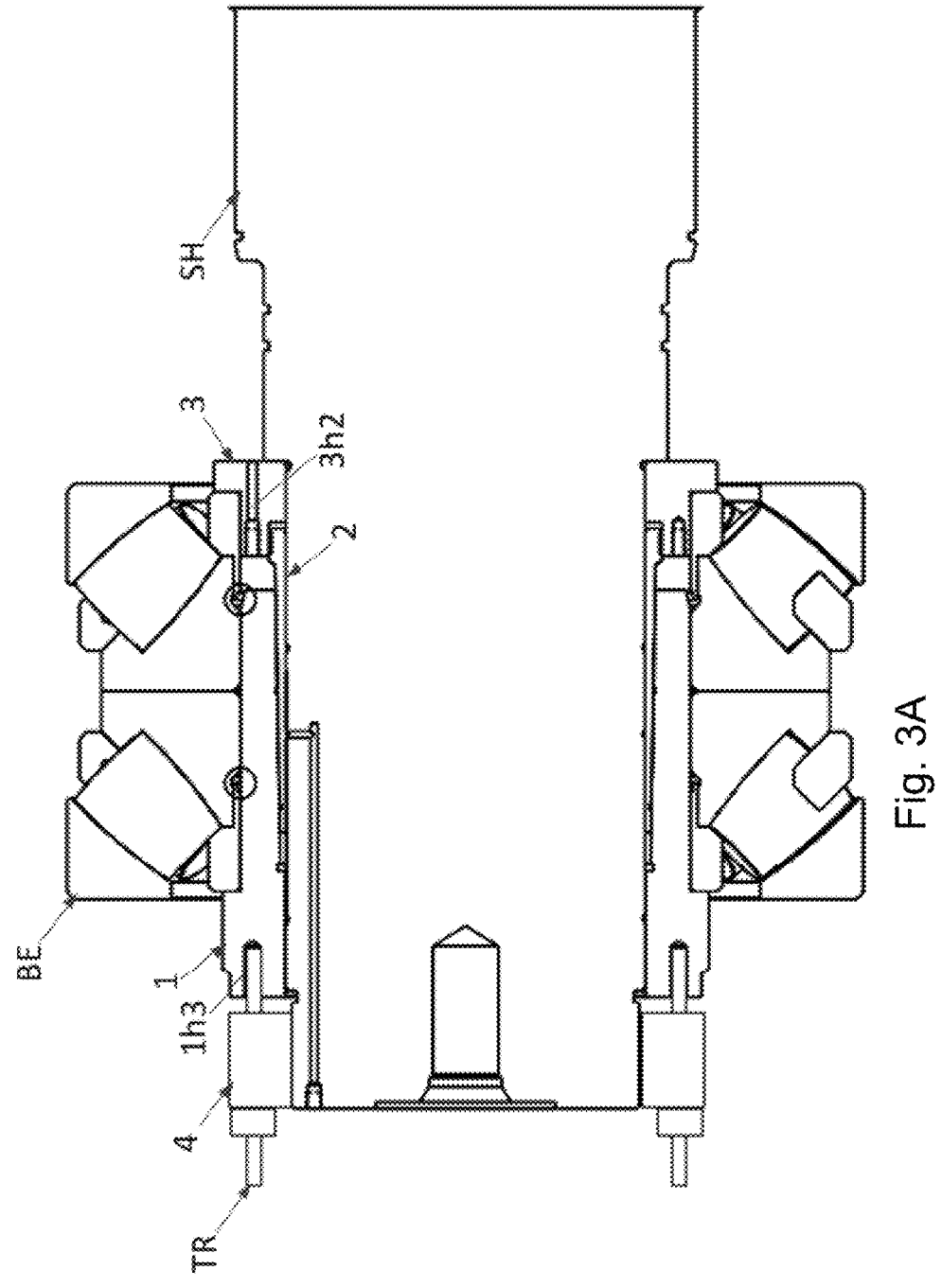
FIGS. 3A and 3B are schematic diagrams illustrating a disassembling method for disassembling a bearing using the mounting and disassembling assembly according to an embodiment of the present application.
Figure 4A:
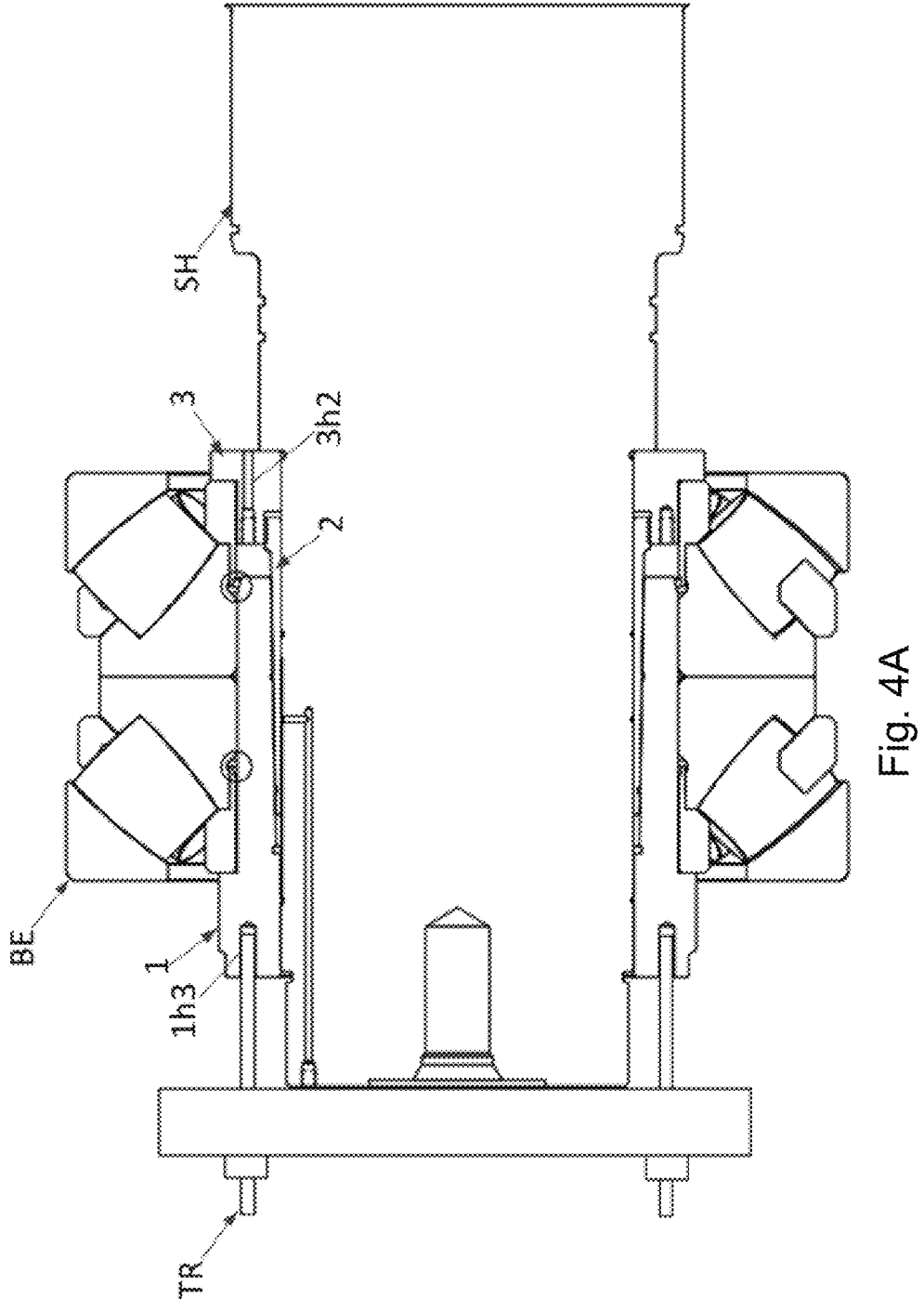
FIGS. 4A and 4B are schematic diagrams illustrating another disassembling method for disassembling a bearing using the mounting and disassembling assembly according to an embodiment of the present application.
Figure 4B:
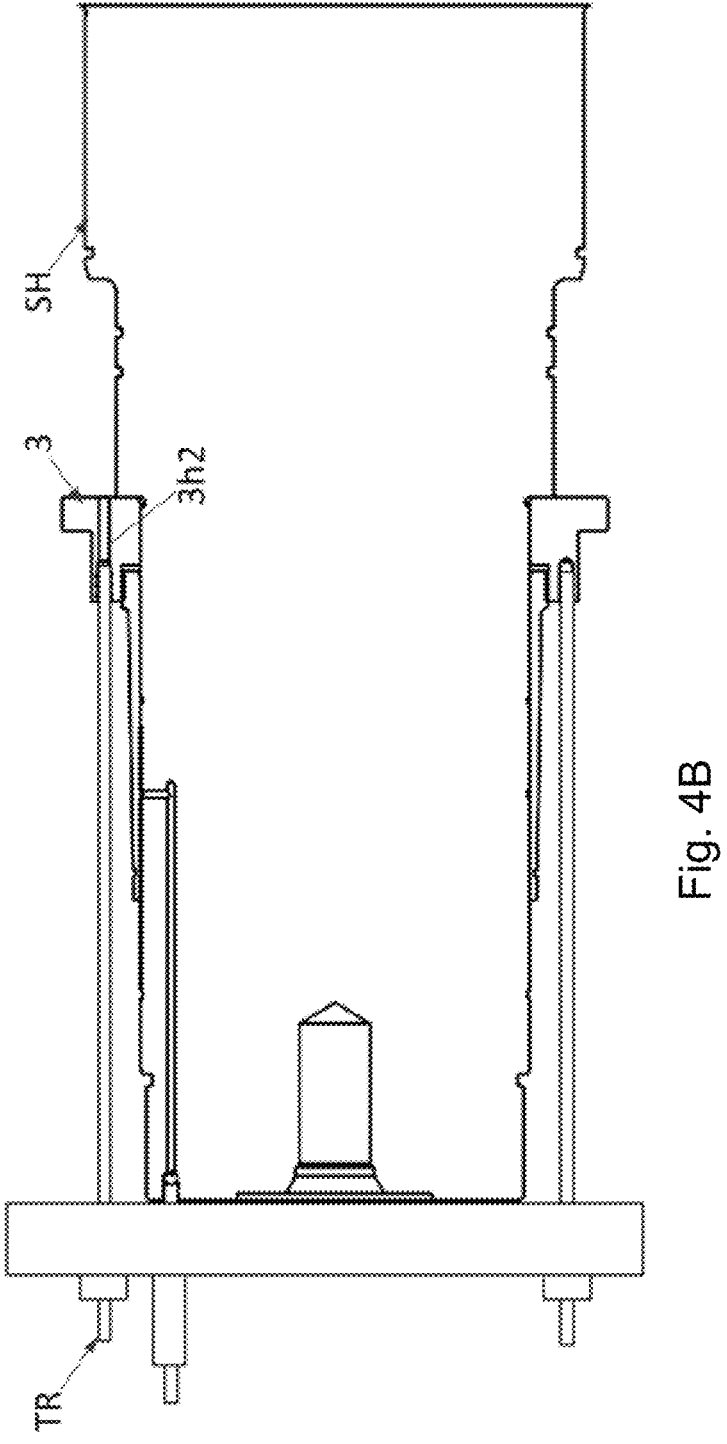

Further, for easy connection with the disassembling tool (below screw TR in FIG. 3A), a plurality of first disassembling holes $1h3$ are formed on the end surface of the other axial end of the outer sleeve 1 (the first large-diameter portion 11 or the end of the outer sleeve 1 away from the first small-diameter portion 12), as shown in FIGS. 1B, 3A and 4A. The plurality of first disassembling holes $1h3$ evenly spaced apart along the circumference each are formed with an internal thread for threaded connection with the disassembling tool. By rotating the locking nut 4 on the shaft SH to make the below second disassembling holes $4h2$ of the locking nut 4 opposite to the first disassembling holes $1h3$, the disassembling tool is mounted into the first and second disassembling holes $1h3$, $4h2$.

Figure 1C:
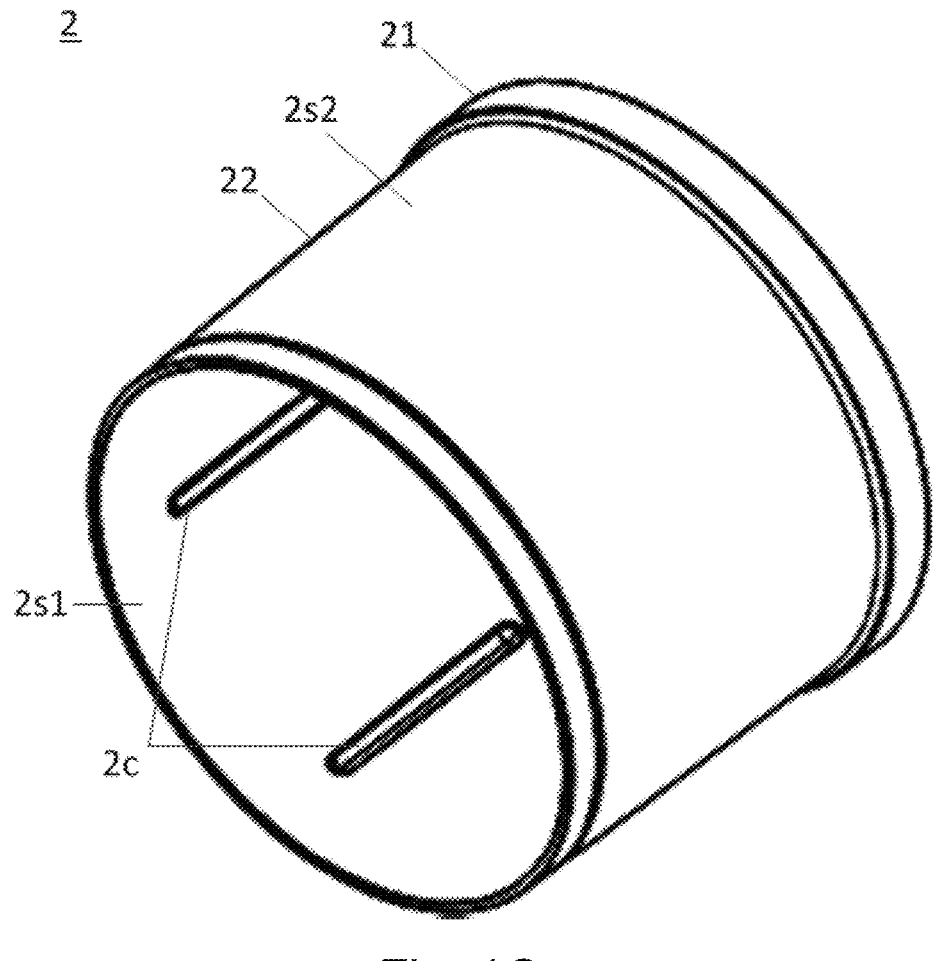
FIG. 1C is a perspective view showing the structure of an inner sleeve of the mounting and disassembling assembly in FIG. 1A.

In the present embodiment, the inner sleeve 2 is cylinder-shaped, as shown in FIGS. 1A and 1C. The inner sleeve 2 includes a threaded portion 21 and a tapered portion 22 that are connected to each other. The threaded portion 21, located at one axial end side of the tapered portion 22, has an outer diameter greater than the maximum outer diameter of the tapered portion 22. At the threaded portion 21, the outer circumferential surface of the inner sleeve 2 is formed with an external thread for threaded connection with the supporting ring 3. At the tapered portion 22, the outer circumferential surface of the inner sleeve 2 forms a second conical surface 2s2 that extends to the other axial end of the inner sleeve 2 (the tapered portion or the end of the inner sleeve 2 away from the threaded portion 21) while extending radially inside from the threaded portion 21. That is, the outer diameter of the tapered portion 22 gradually decreases from the threaded portion 21 toward the other axial end of the inner sleeve 2. Moreover, for the second conical surface 2s2 of the inner sleeve 2 and the first conical surface 1s2 of the outer sleeve 1 to fit in their shapes, the inclination angles of the second conical surface 2s2 and the first conical surface 1s2 relative to the axial direction A are the same. Then, with the second conical surface 2s2 located radially inside and mated with the first conical surface 1s2, the inner sleeve 2 and the outer sleeve 1 can move relatively in the axial direction A. The inner circumferential surface of the inner sleeve 2 is formed with a second cylindrical surface 2s1 (an example of a second mounting surface) for mounting on the shaft SH.

Further, in order to improve the elastic deformation ability of the inner sleeve 2, the second cylindrical surface 2s1 of the inner sleeve 2 is formed with a plurality of grooves 2c, as shown in FIG. 1C. The plurality of grooves 2c spaced apart along the circumference of the inner sleeve 2 each extend (substantially) along the axial direction A, and open radially inside and close in other directions.

Figure 2A:
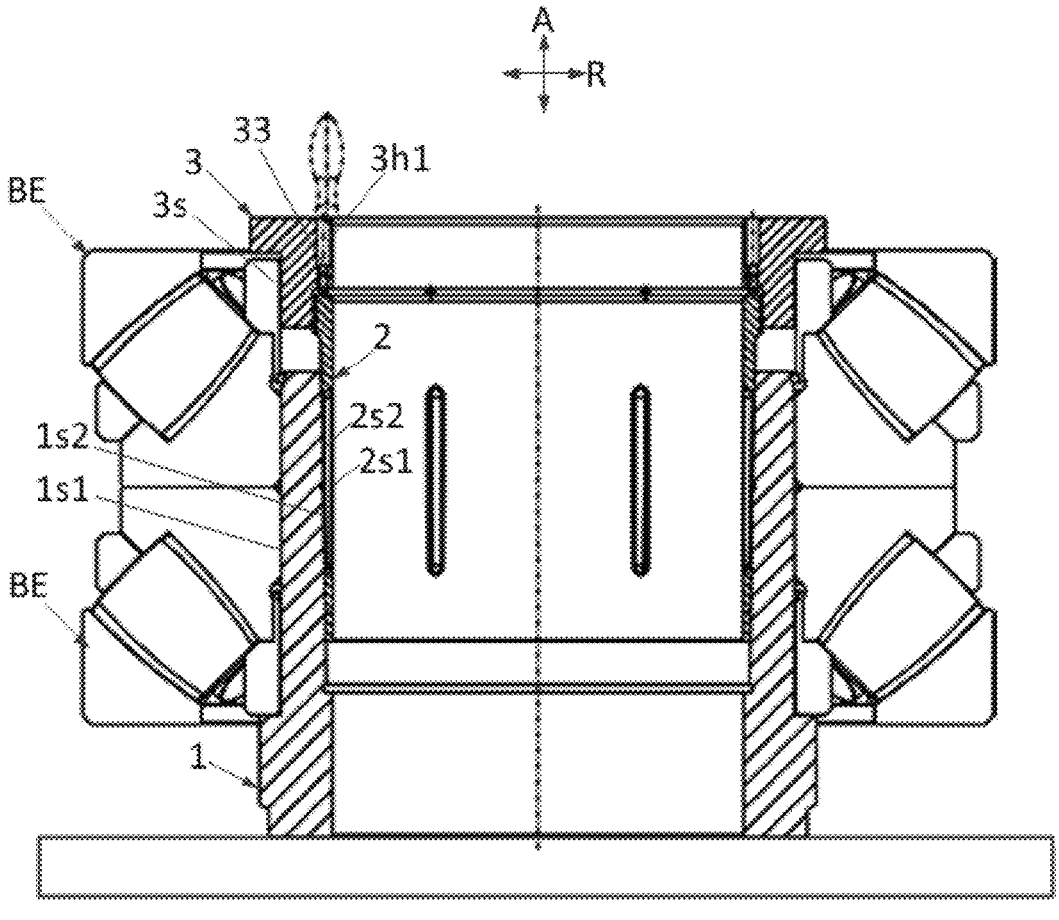
FIGS. 2A to 2F are schematic diagrams illustrating a mounting method for mounting a bearing using the mounting and disassembling assembly according to an embodiment of the present application.

Further, the end surface of one axial end of the inner sleeve 2 (the threaded portion 21 or the end of the inner sleeve 2 away from the tapered portion 22) corresponds to the below fixing holes 3h1 of the supporting ring 3, as shown in FIG. 2A. The mounting and disassembling assembly further includes fixing members 33 such as bolts, which are threadedly connected to the supporting ring 3 when inserted through the fixing holes 3h1. The fixing members 33 abut against the end surface of one axial end of the inner sleeve 2, so that the inner sleeve 2 and the supporting ring can be relatively fixed.

Figure 1D:
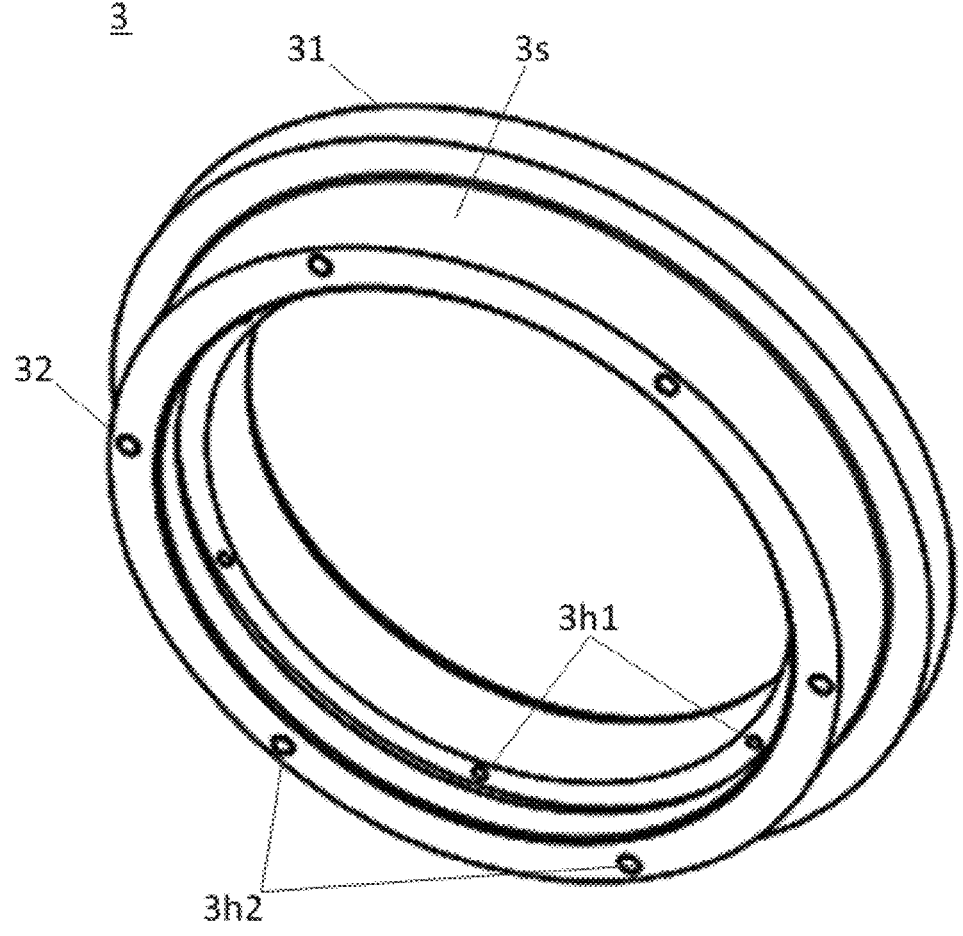
FIG. 1D is a perspective view showing the structure of a support ring of the mounting and disassembling assembly in FIG. 1A.

In the present embodiment, the supporting ring 3 is cylinder-shaped, as shown in FIGS. 1A and 1D. The supporting ring 3 includes a second large-diameter portion 31 and a second small-diameter portion 32 that are connected to each other. The outer diameter of the second large-diameter portion 31 is greater than that of the second small-diameter portion 32. Thereby, the outer circumference of the supporting ring 3 is formed with a second step structure through the second large-diameter portion 31 and the second small-diameter portion 32. At the second small-diameter portion 32, the outer circumferential surface of the supporting ring 3 is formed with a third cylindrical surface 3s (an example of a third mounting surface) for mounting the bearing BE that is the bottom surface of the second step structure. While the bottom surfaces (first cylindrical surface 1s1 and third cylindrical surface 3s) of the second step structure and the first step structure support the bearing BE, the large-diameter portions (first large-diameter portion 11 and third large-diameter portion 31) of the first and second step structures are for defining the axial position of the bearing BE. Here, the surface of the first large-diameter portion 11 facing one axial end side can be referred to as the outer sleeve axial limit surface, and the end surface of the third large-diameter portion 31 facing the other axial end side (the left side in FIG. 2E) as the supporting ring axial limit surface. The outer sleeve axial limit surface and the supporting ring axial limit surface define the axial position of the bearing BE. In addition, the inner circumferential surface of the supporting ring 3 is formed with an internal thread corresponding to the external thread of the threaded portion 21 of the inner sleeve 2. Then the supporting ring 3 can be threadedly connected to the inner sleeve 2, and mounted on the threaded portion 21 by moving said supporting ring 3 relative to the inner sleeve 2 in the axial direction A.

Further, as shown in FIG. 1D, the supporting ring 3 is formed with a plurality of fixing holes 3h1 evenly distributed along the circumference that extends through in the axial direction A. The supporting ring 3 has internal threads formed in the fixing holes 3h1 for threaded connection with the external threads of the fixing members 33. In addition, each fixing hole 3h1 faces the end surface of one axial end of the inner sleeve 2, so that the fixing members 33 extending through the fixing holes 3h1 can abut against the end surface of the one axial end of the inner sleeve 2.

Further, as shown in FIG. 1D, the supporting ring 3 is formed with third disassembling holes 3h2 extending through in the axial direction A. The plurality of third disassembling holes 3h2 evenly distributed along the circumference each are formed with an internal thread for threaded connection with the disassembling tool. By rotating the locking nut 4 on the shaft SH to make the below second disassembling holes 4h2 of the locking nut 4 opposite to the third disassembling holes 3h2, the disassembling tool is mounted into the second and third disassembling holes 4h2, 3h2.

Figure 1E:
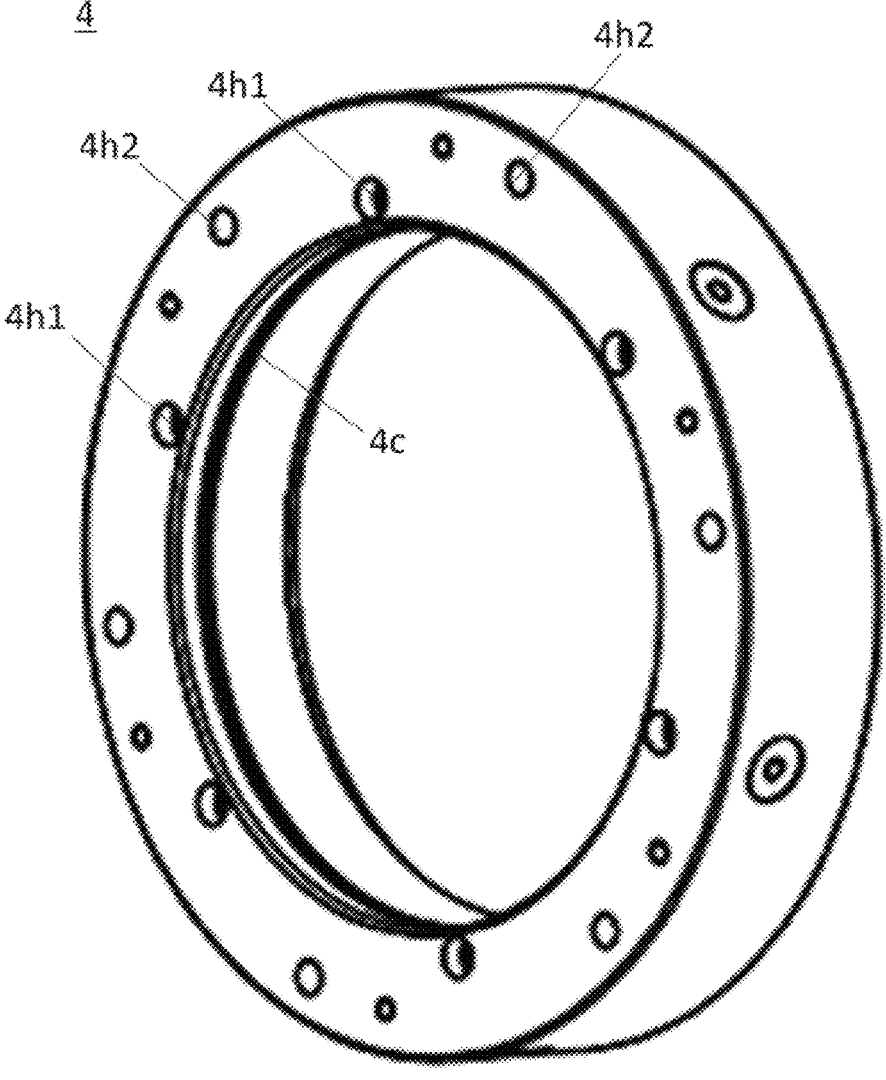
FIG. 1E is a perspective view showing the structure of a locking nut of the mounting and disassembling assembly in FIG. 1A.
Figure 2B:
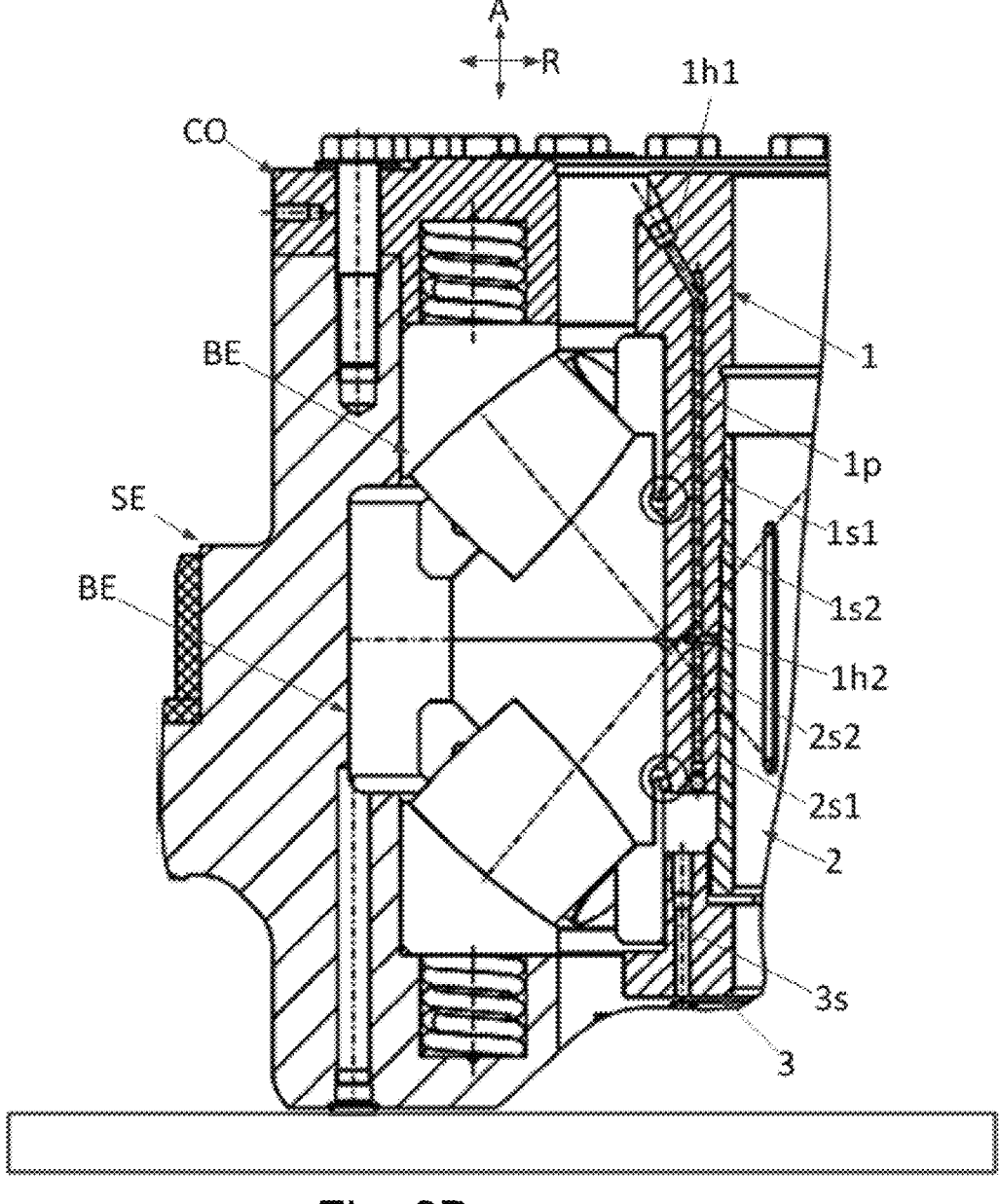
Figure 2C:
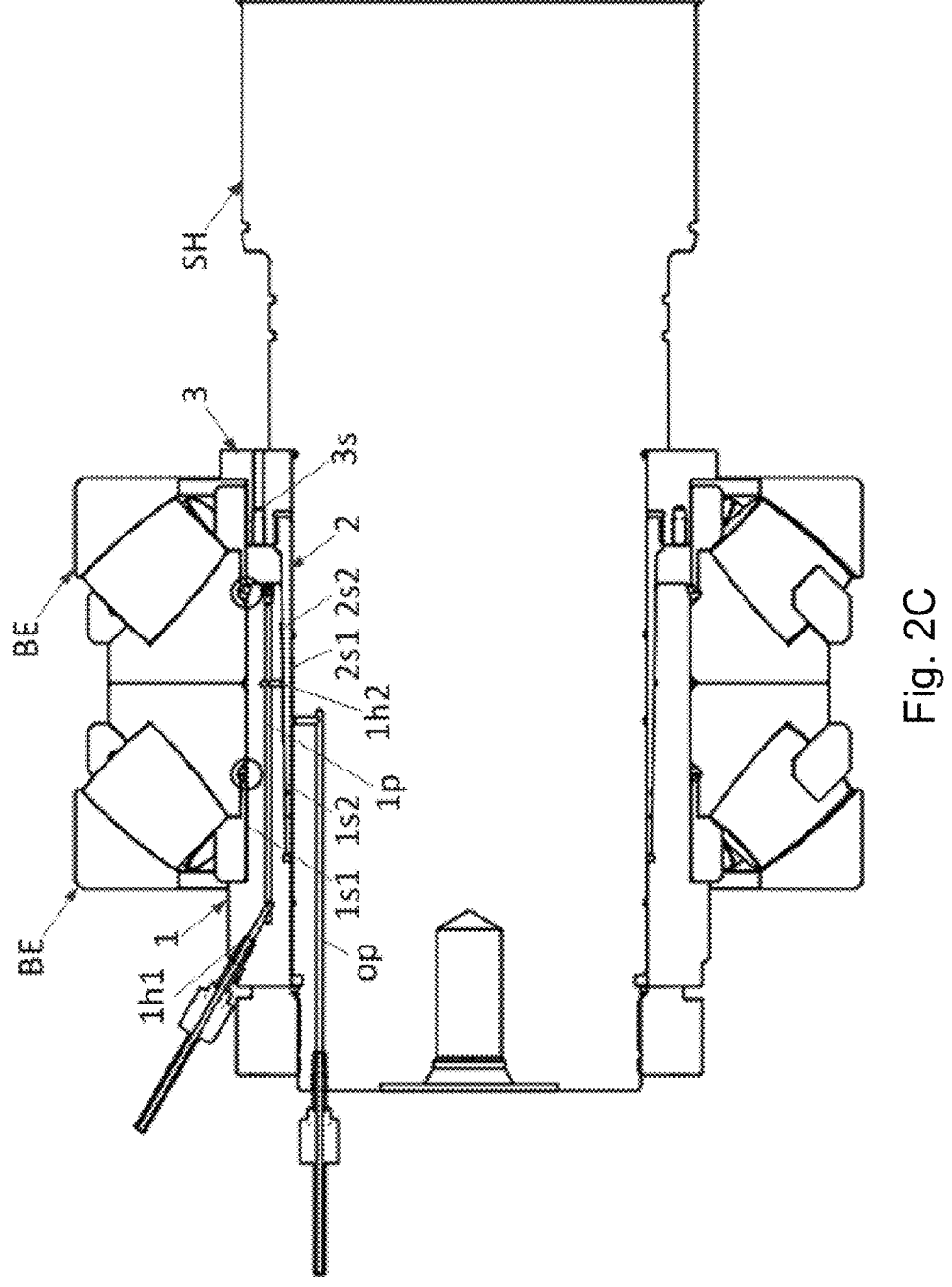

In the present embodiment, as shown in FIGS. 1A and 1E, the inner circumferential surface of the locking nut 4 is formed with an internal thread for threaded connection with the shaft SH, so that the locking nut 4 can be threadedly connected to the shaft SH. As shown in FIG. 2E, with the mounting and disassembling assembly mounted on the shaft SH, the locking nut 4 will abut against the outer sleeve 1 for defining the axial position of the outer sleeve 1 relative to the shaft SH. In addition, the inner circumferential surface of the locking nut 4 is formed with an annular groove 4c extending continuously along the full circumference. The annular groove 4c opening radially inside and recessed radially outside cuts off the internal thread of the locking nut 4 in the axial direction. As shown in FIG. 1E, the locking nut 4 is formed with mounting holes 4h1 extending in the axial direction A and through the annular groove 4c. Specifically, the portions of the mounting holes 4h1 on one axial end side of the ring groove 4c may be threaded, while those on the other axial end side of the ring groove 4c may not be threaded. As shown in FIG. 2E, locking bolt(s) 5 is mounted into and threadedly connected to the mounting hole(s) 4h1, so that the portions on both sides of the ring groove 4c of the locking nut 4 clamp the threads of the shaft SH, thereby defining the axial position of the locking nut 4 relative to the shaft SH, i.e. relatively fixing the locking nut 4 and the shaft SH.

Further, the locking nut 4 is formed with second disassembling holes 4h2 mated with the first and third disassembling holes 1h3, 3h2 and extending through the locking nut 4 in the axial direction A, as shown in FIG. 1E. By rotating the locking nut 4 on the shaft SH, the second disassembling holes 4h2 can be aligned with the first disassembling holes 1h3 of the outer sleeve 1 or the third disassembling holes 3h2 of the supporting ring 3. Then the disassembling tool can be mounted into the first and second disassembling holes 1h3, 4h2 or into the second and third disassembling holes 4h2, 3h2.

The mounting method for mounting the bearing BE on the shaft SH using the above mounting and disassembling assembly will be illustrated below with reference to FIGS. 2A to 2F.

Mounting Method

Take mounting a pair of thrust bearings BE on the shaft SH for example.

First, as shown in FIG. 2A, the bearing BE is mounted on the first cylindrical surface 1s1 of the outer sleeve 1. Specifically, the bearing BE and the outer sleeve 1 need to be mounted together through interference fit, so that the bearing BE or the outer sleeve 1 needs to be heated or cooled respectively before mounting. Then, the outer sleeve 1 is placed on a horizontal mounting supporting surface, and a pair of thrust bearings BE are vertically mounted on the first cylindrical surface 1s1 of the outer sleeve 1. After the pair of thrust bearings BE are mounted in place, the flange of the bearings BE is positioned against the first step structure of the outer sleeve 1 (the first large-diameter portion 11). Upon completing the above procedures, the assembly composed of the bearing BE and the outer sleeve 1 is placed at room temperature.

Further, as shown in FIG. 2A, the inner sleeve 2 is mounted into the outer sleeve 1. Specifically, the inner sleeve 2 is vertically mounted into the assembly composed of the bearing BE and the outer sleeve 1 that is placed on the horizontal mounting supporting surface, so that the first conical surface 1s2 is mated with the second conical surface 2s2. Moreover, the inner sleeve 2 may be vertically pressed a certain distance into the outer sleeve 1 to prevent them from being disconnected during transportation, provided that the inner diameter of the inner sleeve 2 is greater than the outer diameter of the shaft SH to be mounted.

Further, as shown in FIG. 2A, the supporting ring 3 is mounted on the inner sleeve 2 for threaded connection. After the inner sleeve 2 is threadedly connected to the supporting ring 3, the relative position for surface contact between the first conical surface 1s2 of the outer sleeve 1 and the second conical surface 2s2 of the inner sleeve 2 is determined according to the actual sizes of detected points on the inspection report of the outer sleeve 1 and the inner sleeve 2; and the outer sleeve 1 is pushed to place the outer sleeve 1 and the inner sleeve 2 in a predetermined relative position, and enable a gap for clearance fit between the inner sleeve 2 and the shaft SH. In addition, the threaded connection length of the external thread of the inner sleeve 2 and the internal thread of the supporting ring 3 is adjusted according to the actual width sizes on the inspection report of the supporting ring 3 and the bearing BE, so as to ensure the advance distance of the outer sleeve 1 on the inner sleeve 2 in subsequent mounting steps. This advance distance is the axial distance between the flange of the bearing BE and the second step structure (second large-diameter portion 31) of the supporting ring 3 as shown in FIGS. 2A to 2C. When the flange of the bearing BE is in contact with the second step structure of the supporting ring 3, the amount for interference fit between the inner sleeve 2 and the shaft SH can be ensured.

It is to be noted that if the shaft diameter is out of tolerance, the relative position of the supporting ring 3 and the inner sleeve 2 must be adjusted according to the actual shaft diameter to ensure interference fit between each component (i.e., the shaft SH, the inner sleeve 2, the outer sleeve 1, and the bearing inner ring) in subsequent mounting steps. It is to be noted that the above adjustment is subject to parameters such as the maximum tangential stress for the material of the bearing inner ring and the geometric dimensions thereof. The threaded connection length of the internal thread of the supporting ring 3 and the external thread of the inner sleeve 2 may be adjusted by an adjusting handle as shown in FIGS. 1A and 2A. After the position of the supporting ring 3 is determined, the adjusting handle is removed, and the supporting ring 3 and the inner sleeve 2 are relatively fixed by fixing members 33 such as locking screws. FIG. 2A shows a schematic diagram of the assembly following the above mounting steps.

In addition, when a bearing seat SE needs to be mounted, the assembly following the above mounting steps is turned (i.e. turned upside down), and mounted in the bearing seat SE placed on the horizontal mounting supporting surface; and then an end cover CO is mounted, and joined together with the bearing seat SE by bolts to obtain the finished assembly as shown in FIG. 2B. Then, the assembly composed of the bearing BE, the outer sleeve 1, the inner sleeve 2, the supporting ring 3, the bearing seat SE and the end cover CO is horizontally or vertically mounted on the shaft SH until the axial end surface of the second large-diameter portion 31 of the supporting ring 3 abuts against the shoulder of the shaft SH. The whole assembly is positioned in the axial direction by the supporting ring 3 abutting against the shoulder of the shaft SH. Since the inner diameter of the outer sleeve 1 is slightly greater than the shaft diameter, the inner sleeve 2 and the supporting ring 3 are in clearance fit with the shaft SH in this step. Thus, the above mounting procedure can be accomplished without any auxiliary devices.

Figure 2D:
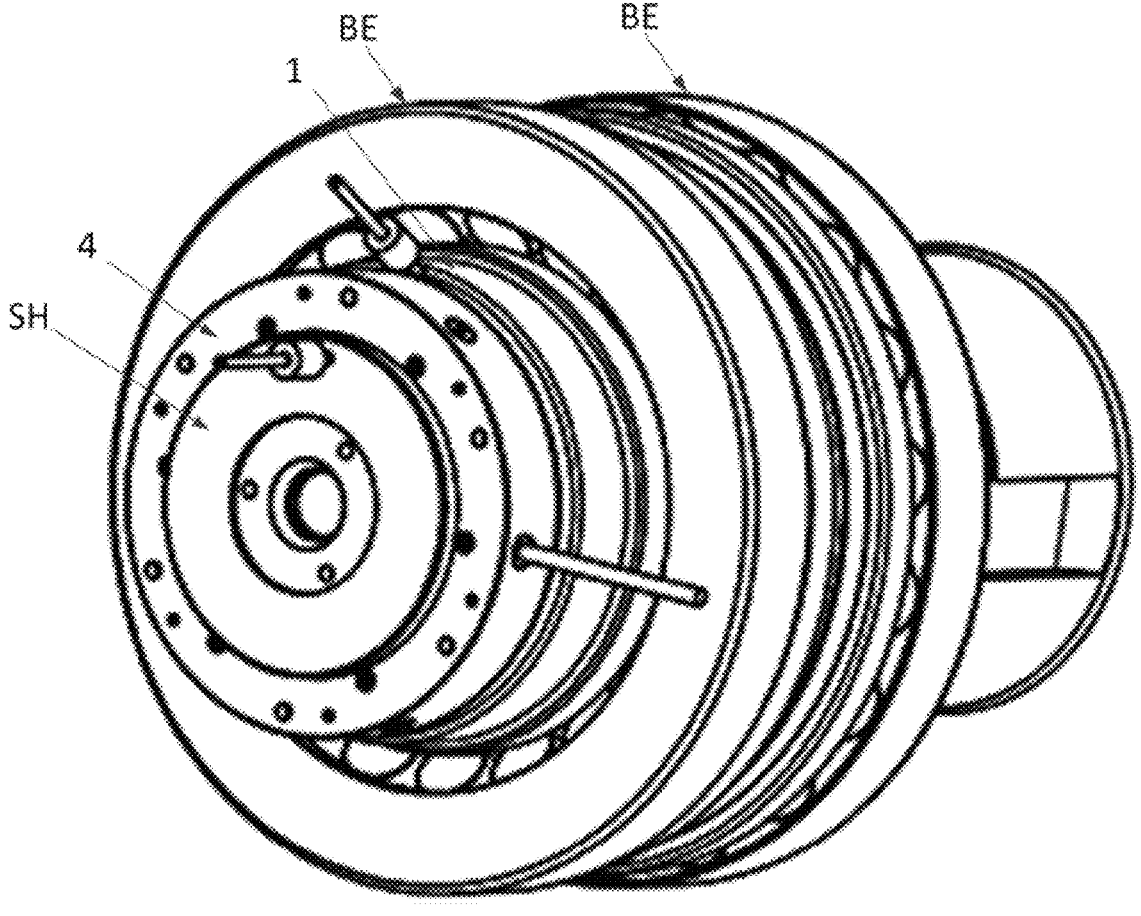
Figure 2E:
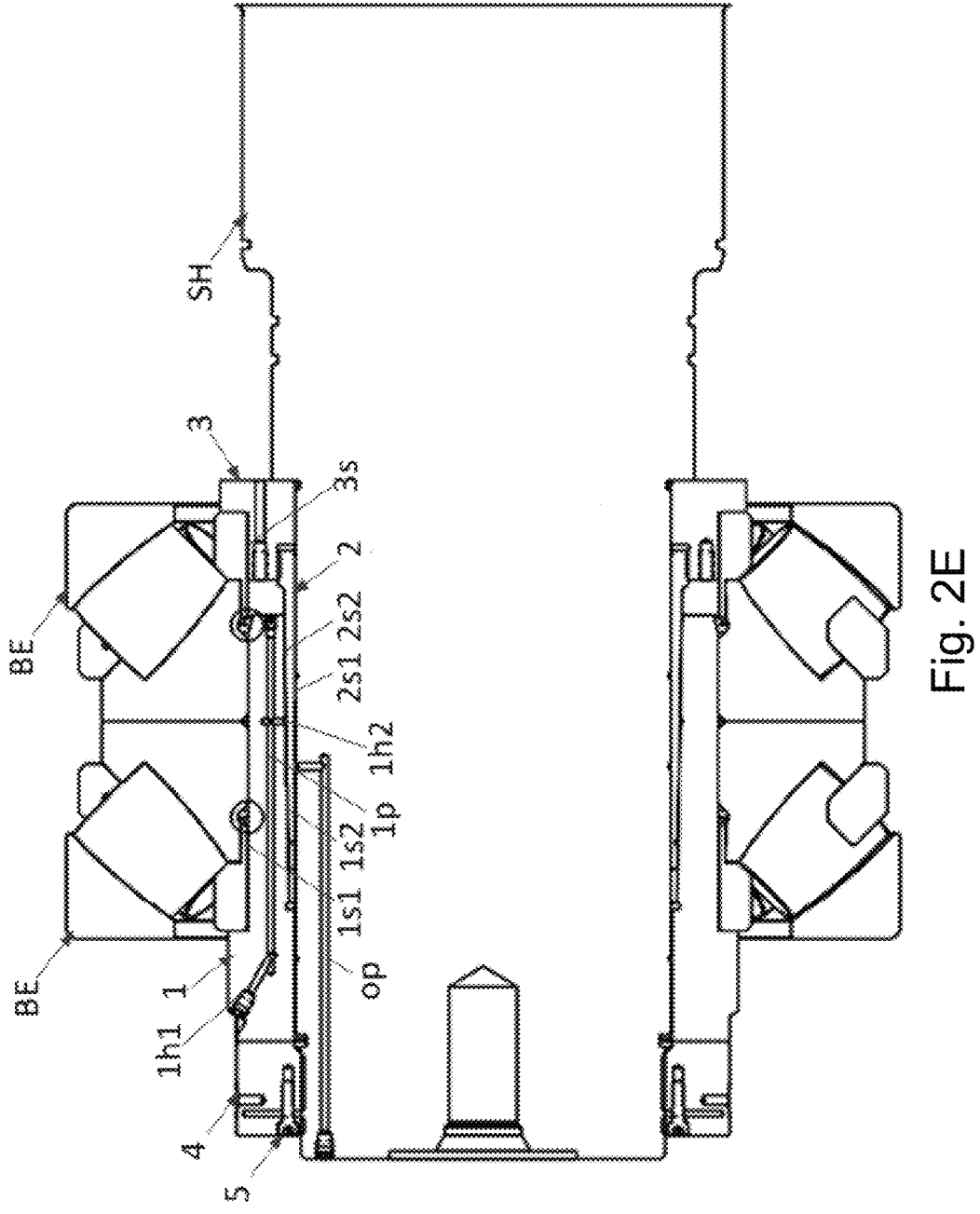

Further, as shown in FIGS. 2C and 2D, hydraulic nuts and hydraulic pump connectors are mounted on the shaft SH. The hydraulic nuts exert axial thrust on the outer sleeve 1 until the flange of the bearing BE is in contact with the second large-diameter portion 31 of the supporting ring 3. In the above process, the inner oil groove in the first conical surface 1s2 of the outer sleeve 1 makes it possible to provide oil pressure and form an oil film between the first conical surface 1s2 of the outer sleeve 1 and the second conical surface 2s2 of the inner sleeve 2. The friction between the first conical surface 1s2 and the second conical surface 2s2 is reduced, thereby decreasing the axial thrust. The distance from the end surface of the outer sleeve 1 to that of the shaft SH (the left side end surface in FIG. 2C) can be detected to determine whether the bearing BE is properly mounted. Upon the determination that the bearing BE is properly mounted, the hydraulic nuts need to be kept under the pressure for a predetermined time; otherwise, they need to be further advanced to exert axial thrust on the outer sleeve 1. After pressure retention, the hydraulic nuts and the hydraulic pump connectors are removed, and caps are used to seal the oil inlet 1h1 of the outer sleeve 1 and the oil inlet of the shaft SH (on the end surface of the axial end of the shaft SH) to prevent foreign matter from entering the interior of the bearing BE.

Figure 2F:
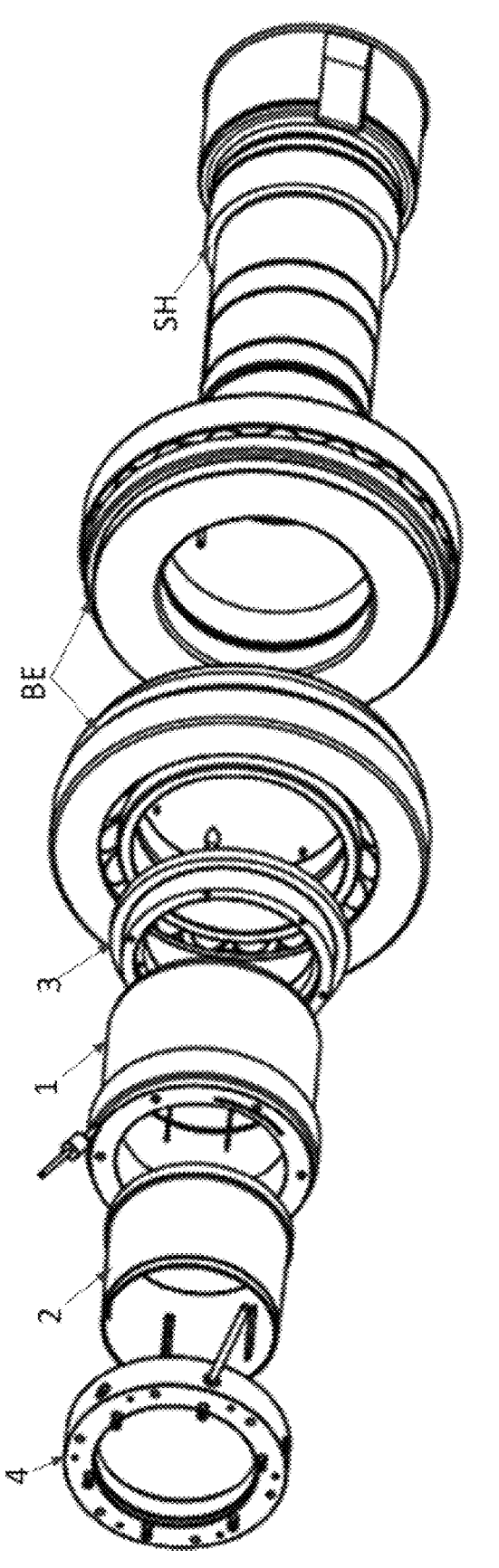

Finally, as shown in FIGS. 2E and 2F, the locking nut 4 is mounted at the end of the shaft SH, with at least 80% of the end surface of the locking nut 4 abutting against that of the outer sleeve 1; and the locking nut 4 is locked by locking bolts 5 and relatively fixed with the shaft SH, which works together with the shoulder to axially limit the assembly composed of the outer sleeve 1, the inner sleeve 2, the supporting ring 3 and the bearing BE. With the above steps, the whole mounting process is completed.

The shaft and bearing assembly according to the present application can be obtained by the above mounting method.

The Structure of the Shaft and Bearing Assembly
According to the Present Application As shown in FIGS. 2E and 2F, the shaft and bearing assembly according to the present application includes the shaft SH, the bearing BE, and the mounting and disassembling assembly that are assembled together. The outer sleeve 1, the inner sleeve 2 and the supporting ring 3 are at least partially located between the shaft SH and the bearing BE. The locking nut 4 and the shoulder of the shaft SH define the axial position of the assembly composed of the outer sleeve 1, the inner sleeve 2, the supporting ring 3 and the bearing BE.

Further, the shaft SH is formed with a shaft oil supply passage op having an oil inlet on the end surface of one axial end of the shaft SH and an oil outlet at the portion of the outer circumferential surface of the shaft SH opposite to the second cylindrical surface 2s1 of the inner sleeve 2. Thus, it is possible to provide oil pressure and form an oil film between the outer circumferential surface of the shaft SH and the second cylindrical surface 2s1 of the inner sleeve 2 during disassembling. This facilitates the relative movement of the inner sleeve 2 and the shaft SH in the axial direction and thus the disassembling of the inner sleeve.

The disassembling method for disassembling the bearing BE from the shaft SH using the mounting and disassembling assembly will be illustrated below with reference to FIGS. 3A, 3B, 4A and 4B.

Disassembling Method

With the shaft and bearing assembly described above, the disassembling method using the mounting and disassembling assembly is illustrated as follows.

In one disassembling method (FIG. 3A), the locking bolts 5 and the caps of the outer sleeve 1 and the shaft SH are first removed. Then, the locking nut 4 is rotated in the direction of detaching from the shaft end threads, so that a certain gap is left between the end surfaces of the locking nut 4 and the outer sleeve 1 as a disassembling space for the assembly composed of the outer sleeve 1, the bearing BE and other components.

Further, the hydraulic pump connector is mounted to the oil inlet 1h1 of the outer sleeve 1 to pump hydraulic oil for the outer sleeve 1, which provides oil pressure and forms an oil film between the first conical surface 1s2 of the outer sleeve 1 and the second conical surface 2s2 of the inner sleeve 2. If the acting force generated by the hydraulic oil is not sufficient to disassemble the outer sleeve 1, the second disassembling hole 4h2 of the axial locking nut 4 is aligned with the first disassembling hole 1h3 of the outer sleeve 1, as shown in FIG. 3A. The screw TR extends through the unthreaded second disassembling hole 4h2 of the locking nut 4 into the first disassembling hole 1h3 of the outer sleeve 1 for threaded connection. A nut is screwed at the free end of the screw TR. By rotating the nut with a tool such as a torque wrench, the screw TR drives the outer sleeve 1 to detach it from the inner sleeve 2. The hydraulic pump connector, the nut, the screw TR and the locking nut 4 are sequentially removed. Following that is the removal of the assembly composed of the outer sleeve 1, the bearing BE, the bearing seat SE and the end cover CO.

Figure 3B:
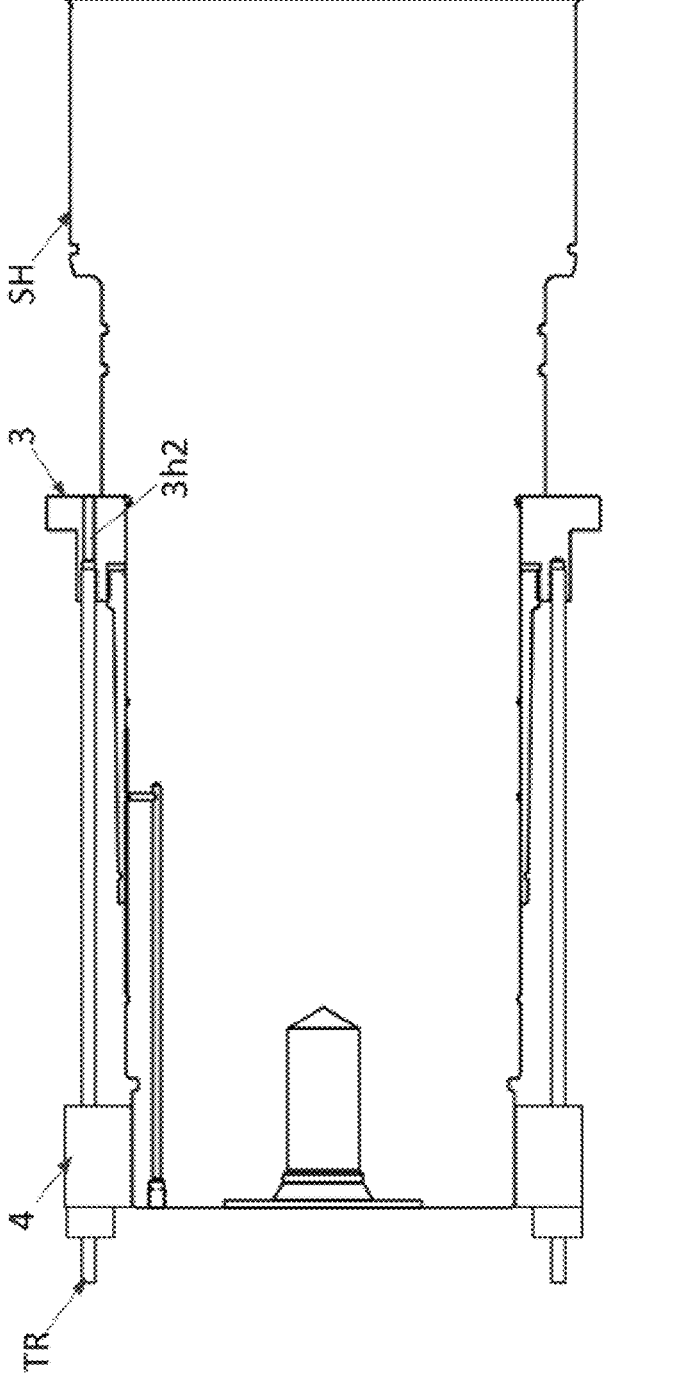

Further, if the inner sleeve 2 and the supporting ring 3 cannot be manually removed, the locking nut 4 is remounted on the shaft end, with the second disassembling hole 4h2 of the locking nut 4 aligned with the third assembling hole 3h2 of the supporting ring 3, as shown in FIG. 3B. The screw TR extends through the unthreaded second disassembling hole 4h2 of the locking nut 4 into the third disassembling hole 3h2 of the supporting ring 3 for threaded connection. A nut is then screwed at the free end of the screw TR. The hydraulic pump connector is mounted to the oil inlet of the shaft oil supply passage op to pump hydraulic oil for the shaft SH. The hydraulic oil may protect the shaft SH from being damaged in removing the inner sleeve 2, making the disassembling process easier. By rotating the nut with a tool such as a torque wrench, the screw TR drives the inner sleeve 2 to remove the inner sleeve 2 and the supporting ring 3 by a distance. The hydraulic pump connector, the nut, the screw TR and the locking nut 4 are removed sequentially. Then the inner sleeve 2 and the supporting ring 3 may be manually removed from the shaft SH. With the above steps, the whole disassembling process is completed.

In another alternative disassembling method (FIGS. 4A and 4B), the locking nut 4 may be replaced with a disassembling plate during disassembling. If the disassembling load exerted by the nut is insufficient, a jack may be mounted between the disassembling plate and the shaft end to detach the bearing BE and the outer sleeve 1 from the conical surface of the inner sleeve 2.

The present application is not limited to the above embodiments, and those skilled in the art may make various modifications to the above embodiments under the teaching of the present application without departing from the scope of the present application. In addition, further explanation is provided as follows.

i. It is to be understood that the mounting and disassembling assembly according to the present application may be applied in mounting and disassembling different types of bearings and shafts. With the mounting and disassembling assembly according to the present application, the mounting and disassembling process is simple and easy to implement, and no damage will be caused to the bearing during mounting and disassembling.

ii. It is to be understood that although the first, second and third mounting surfaces respectively for the outer sleeve 1, the inner sleeve 2 and the supporting ring 3 are all cylindrical surfaces in the above specific embodiments, the present application is not limited to this. The specific shapes of the first, second and third mounting surfaces may be correspondingly set as needed.

iii. It is to be understood that since there is only a pair of relatively sliding surfaces (the first conical surface 1s2 and the second conical surface 2s2) during mounting and disassembling with the mounting and disassembly assembly according to the present application, no damage will be caused to the bearing BE and the shaft SH. Moreover, by adjusting the relative position between the supporting ring 3 and the inner sleeve 2, the sliding distance of the outer sleeve 1 on the inner sleeve 2 can be predefined to facilitate mounting. Further, with corresponding disassembling holes in the outer sleeve 1, the supporting ring 3 and the locking nut 4, the disassembling process can be easily completed by a screw-nut mechanism extending through these holes. Such disassembling is very convenient and fast, without any damage to the bearing BE and shaft SH.

iv. It is to be understood that the small-diameter portion 32 of the supporting ring 3 can be omitted. In other words, the supporting ring 3 only needs to axially limit the bearing BE, without supporting the bearing BE radially inside.

LIST OF REFERENCE NUMERALS

1 Outer sleeve
11 First large-diameter portion
12 First small-diameter portion
1s1 First cylindrical surface (first mounting surface)
1s2 First conical surface
1c1 Axial oil groove(s)
1c2 Circumferential oil groove
1p Oil supply passage
1h1 Oil inlet
1h2 Oil outlet
1h3 First disassembling hole(s)
2 Inner sleeve
21 Threaded portion
22 Tapered portion
2s1 Second cylindrical surface (second mounting surface)
2s2 Second conical surface
2c Groove(s)
3 Support ring
31 Second large-diameter portion
32 Second small-diameter portion
33 Fixing member(s)
3s Third cylindrical surface (third mounting surface)
3h1 Fixing hole(s)
3h2 Third disassembling hole(s)
4 Locking nut
4c Annuler groove
4h1 Mounting hole(s)
4h2 Second disassembling hole(s)
5 Locking bolt(s)
SH Shaft
op Shaft oil supply passage
BE Bearing
CO End cover
SE Bearing seat
TR Screw
A Axial direction
R Radial direction.

The invention claimed is:

1. A mounting and disassembling assembly for mounting a bearing on and disassembling the bearing from a shaft, the assembly comprising:

an outer sleeve having an outer circumferential surface formed with a first mounting surface for mounting the bearing, and an inner circumferential surface formed with a first conical surface that extends to one axial end of the outer sleeve in an axial direction of the mounting and disassembling assembly while extending radially outwardly;

an inner sleeve having an inner circumferential surface formed with a second mounting surface for mounting on the shaft, and an outer circumferential surface formed with a second conical surface and a threaded portion located on one axial end side of the second conical surface, the second conical surface extends to the other axial end of the inner sleeve in the axial direction while extending radially inwardly from the threaded portion, wherein with the second conical surface located radially inside and in contact with the first conical surface, the inner sleeve and the outer sleeve are moveable relatively in the axial direction; and a supporting ring threadedly connected to the threaded portion, the supporting ring and the inner sleeve are moveable relatively in the axial direction while maintaining threaded connection.

2. The mounting and disassembling assembly according to claim 1, further comprising a locking nut threadedly connected to the shaft to define an axial position of the outer sleeve relative to the shaft at the other axial end of the outer sleeve.

3. The mounting and disassembling assembly according to claim 2, further comprising locking bolts, an inner circumferential surface of the locking nut is formed with an annular groove extending along a circumference of the mounting and disassembling assembly; with the mounting and disassembling assembly mounted on the shaft, the locking nut abuts against the outer sleeve; and the locking nut is formed with mounting holes extending in the axial direction and through the annular groove, and the locking bolts are mounted into the mounting holes to lock an axial position of the locking nut relative to the shaft.

4. The mounting and disassembling assembly according to claim 2, wherein the outer sleeve is formed with first disassembling holes extending in the axial direction, the locking nut is formed with second disassembling holes extending through the locking nut in the axial direction and mated with the first disassembling holes; and by rotating the locking nut relative to the shaft, the second disassembling holes are alignable with the first disassembling holes.

5. The mounting and disassembling assembly according to claim 4, wherein the supporting ring is formed with third disassembling holes extending in the axial direction; and by rotating the locking nut relative to the shaft, the second disassembling holes are alignable with the third disassembling holes.

6. The mounting and disassembling assembly according to claim 1, wherein the outer sleeve is formed with a first step structure, a bottom surface of which is the first mounting surface; and the first step structure and the supporting ring define an axial position of the bearing.

7. The mounting and disassembling assembly according to claim 6, wherein the supporting ring is formed with a second step structure, a bottom surface of which is a third mounting surface for supporting the bearing.

8. The mounting and disassembling assembly according to claim 1, wherein the first conical surface of the outer sleeve is formed with an inner oil groove that opens radially inside, and an oil supply passage in communication with the inner oil groove is formed inside the outer sleeve.

9. The mounting and disassembling assembly according to claim 8, wherein the inner oil groove comprises a circumferential oil groove, and a plurality of axial oil grooves spaced apart along a circumference of the mounting and disassembling assembly, each extending in the axial direction; and the circumferential oil groove extends continuously along the circumference and is in communication with each of the axial oil grooves.

10. A disassembling method for disassembling a bearing from a shaft using the mounting and disassembling assembly according to claim 8, comprising the steps of:

with hydraulic oil supplied to the oil supply passage of the outer sleeve, separating the outer sleeve from the inner sleeve, and disassembling the outer sleeve from the shaft.

11. The disassembling method according to claim 10, further comprising during disassembling the inner sleeve from the shaft, supplying hydraulic oil between the shaft and the inner sleeve through an shaft oil supply passage of the shaft.

12. The mounting and disassembling assembly according to claim 1, wherein the second mounting surface of the inner sleeve is formed with a plurality of grooves spaced apart along a circumference of the mounting and disassembling assembly, each opening radially inside and extending in the axial direction.

13. The mounting and disassembling assembly according to claim 1, wherein the supporting ring is formed with fixing holes extending therethrough in the axial direction and facing one axial end surface of the inner sleeve, the mounting and disassembling assembly further comprises fixing members that extend through the fixing holes and abut against the axial end surface of the inner sleeve, so that the inner sleeve and the supporting ring are relatively fixed.

14. A shaft and bearing assembly, comprising a shaft, a bearing , and the mounting and disassembling assembly according to claim 1, wherein the outer sleeve, the inner sleeve and the supporting ring of the mounting and disassembling assembly are at least partially located between the shaft and the bearing, and the bearing is mounted on and disassembled from the shaft by using the mounting and disassembling assembly.

15. The shaft and bearing assembly according to claim 14, wherein a shaft oil supply passage is formed inside the shaft, with an oil outlet disposed in an outer circumferential surface of the shaft and facing the second mounting surface of the inner sleeve.

16. The shaft and bearing assembly according to claim 14, wherein the shaft is formed with a shoulder abutting against the supporting ring, so that the shoulder axially limits the mounting and disassembling assembly.

17. A mounting method for mounting a driven bearing on a shaft using the mounting and disassembling assembly according to claim 1, comprising the steps of:

fixing the bearing to the first mounting surface of the outer sleeve in a nested manner to abut against a first step structure of the outer sleeve;

inserting the inner sleeve into the outer sleeve to have the second conical surface in contact with the first conical surface;

threadedly connecting the supporting ring to the inner sleeve, adjusting a threaded connection length of the supporting ring and the inner sleeve to have a predetermined axial gap between the bearing and a supporting ring axial limiting surface of the supporting ring, and then fixing the supporting ring and the inner sleeve;

fixing the assembly including the outer sleeve, the inner sleeve, the supporting ring and the bearing on the shaft in a nested manner so that the supporting ring abuts against a shoulder of the shaft; and pushing the outer sleeve so that the outer sleeve and the bearing move relative to the inner sleeve in the axial direction, and finally the bearing abuts against the supporting ring axial limiting surface of the supporting ring in the axial direction.

18. The mounting method according to claim 17, wherein during pushing the outer sleeve, hydraulic oil is supplied between the first conical surface and the second conical surface via an oil supply passage of the outer sleeve.

19. The mounting method according to claim 17, further comprising after the bearing finally abuts against the supporting ring axial limiting surface of the supporting ring in the axial direction, mounting a locking nut of the mounting and disassembling assembly on the shaft against the outer sleeve.

20. A disassembling method for disassembling a bearing from a shaft using the mounting and disassembling assembly according to claim 1, comprising the steps of:

disassembling the outer sleeve and the bearing from the shaft using a screw that passes through a locking nut fixed to the shaft or a disassembling plate abutting against the shaft and is screwed into first disassembling holes of the outer sleeve; and then disassembling the inner sleeve from the shaft using a screw that passes through a locking nut or the disassembling plate and is screwed into third disassembling holes of the supporting ring.

* * * * *